Feb. 13, 1968 E. R. BRUMMETT 3,368,612
REGENERATOR SEAL

Filed Nov. 9, 1966 5 Sheets-Sheet 1

INVENTOR.
Earl R. Brummett
BY
Paul Fitzpatrick
ATTORNEY

Feb. 13, 1968  E. R. BRUMMETT  3,368,612
REGENERATOR SEAL
Filed Nov. 9, 1966  5 Sheets-Sheet 2
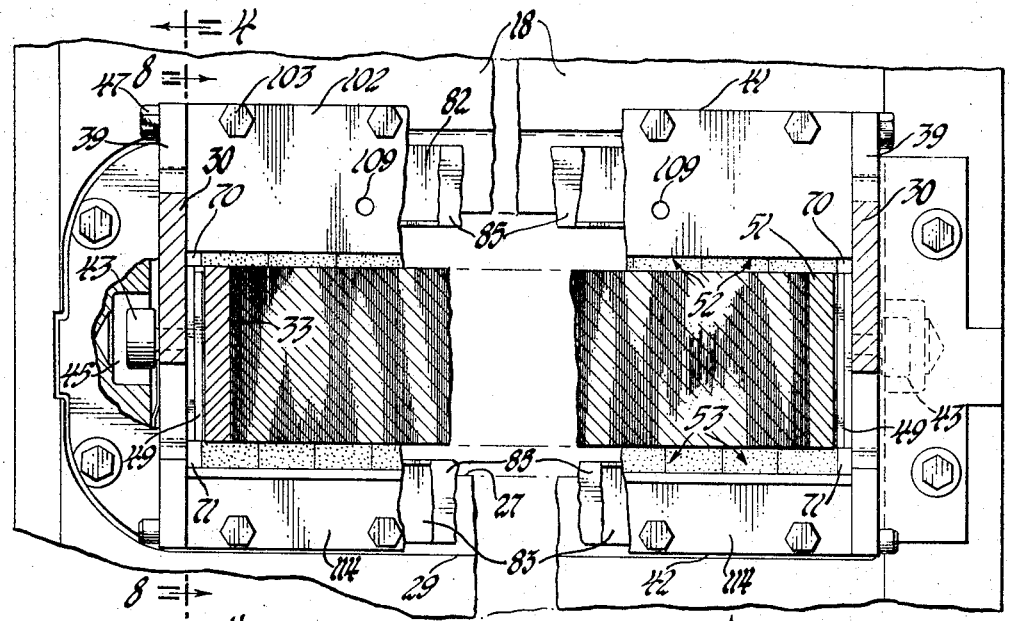
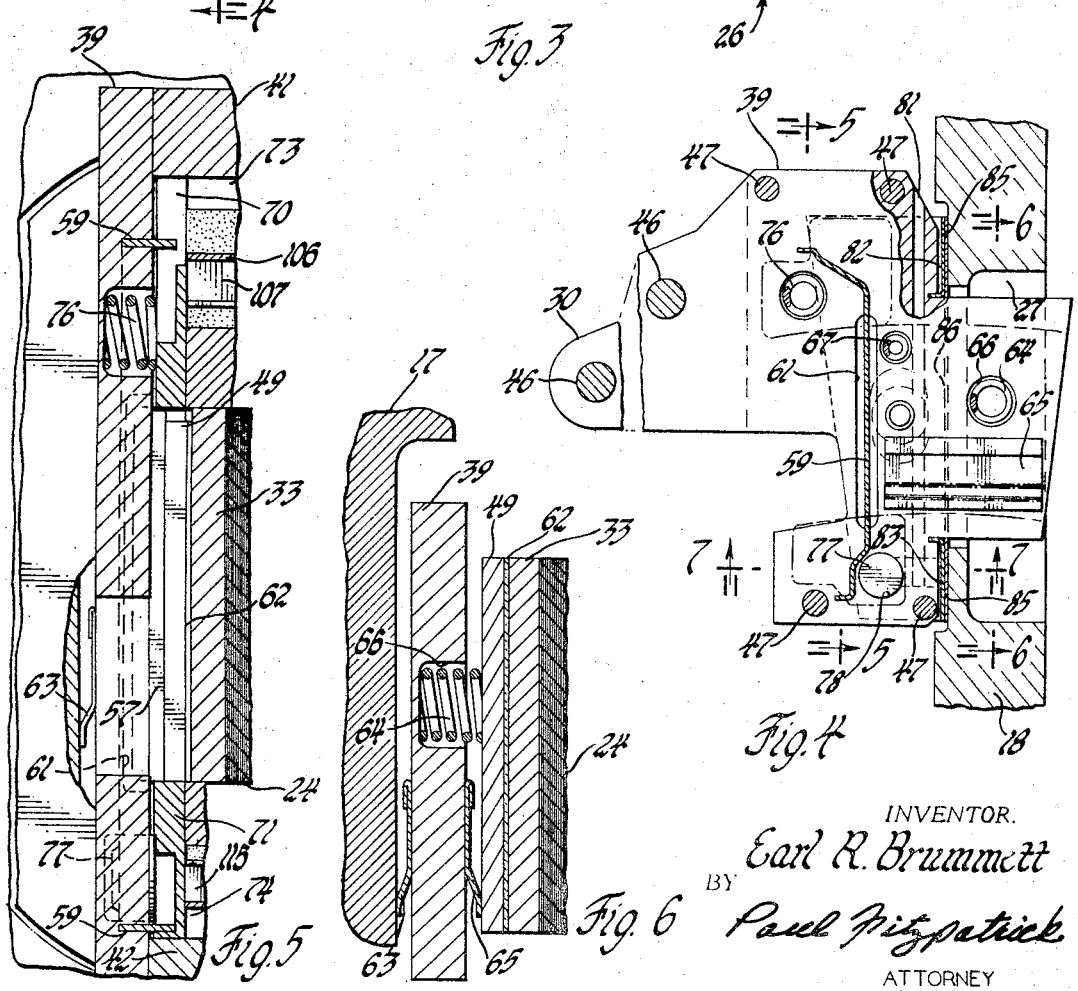
INVENTOR.
Earl R. Brummett
BY
Paul Fitzpatrick
ATTORNEY Feb. 13, 1968 — E. R. BRUMMETT — 3,368,612
REGENERATOR SEAL
Filed Nov. 9, 1966 — 5 Sheets-Sheet 3
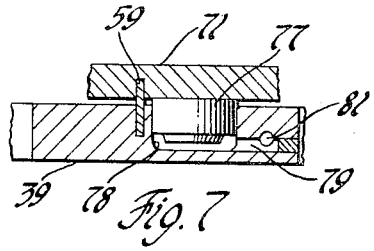
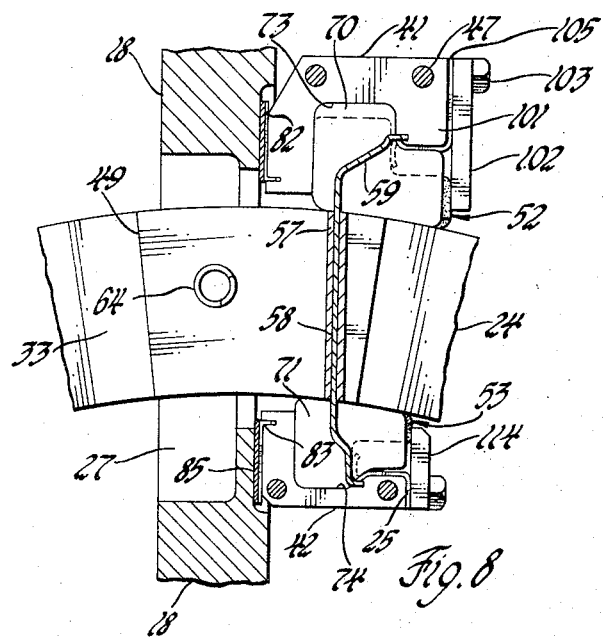
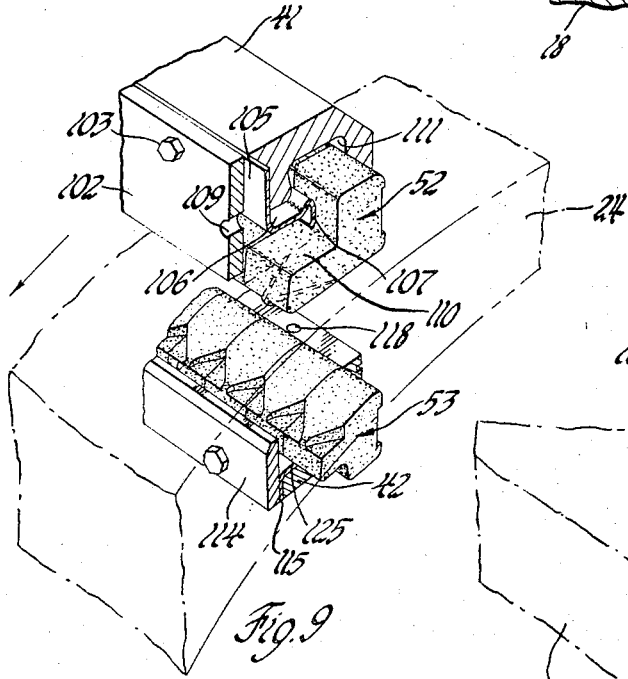
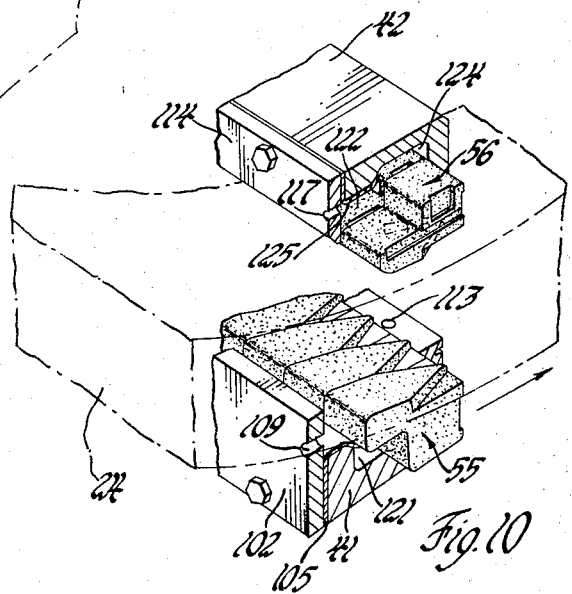
INVENTOR.
Earl R. Brummett
BY
Paul Fitzpatrick
ATTORNEY Feb. 13, 1968

E. R. BRUMMETT 3,368,612

REGENERATOR SEAL

Filed Nov. 9, 1966

INVENTOR.
Earl R. Brummett
BY
Paul Fitzpatrick
ATTORNEY

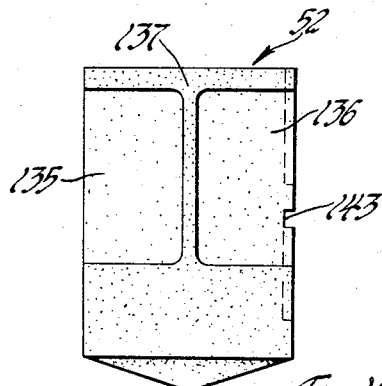
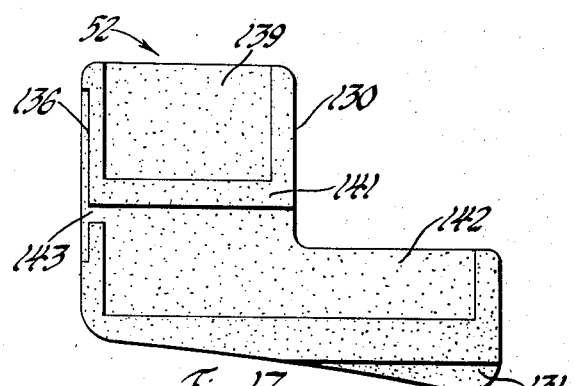
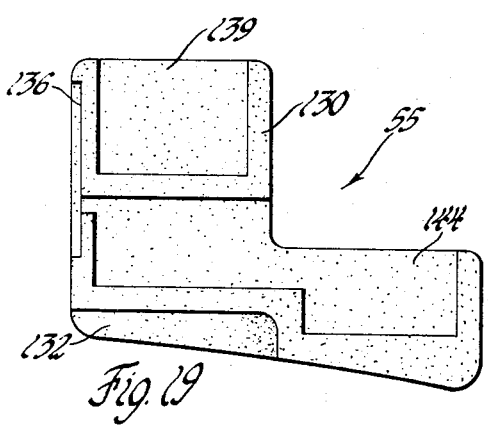
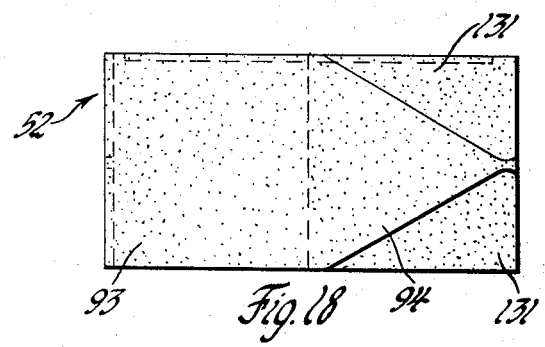
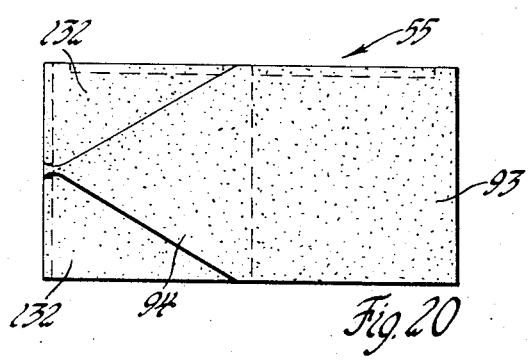
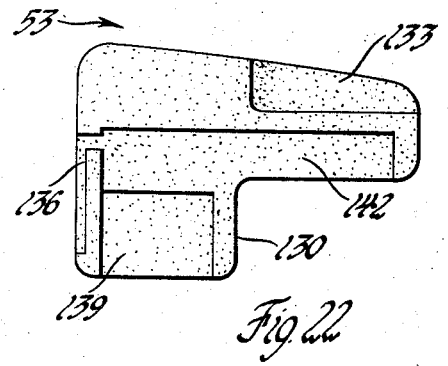
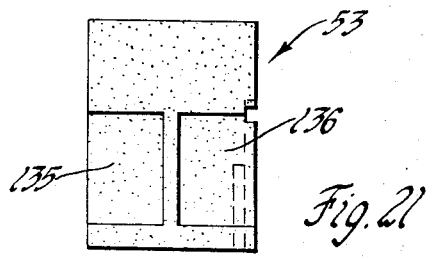

United States Patent Office 3,368,612
Patented Feb. 13, 1968

3,368,612
REGENERATOR SEAL
Earl R. Brummett, Indianapolis, Ind., assignor to General Motors Corporation, Detroit, Mich., a corporation of Delaware
Filed Nov. 9, 1966, Ser. No. 593,200
26 Claims. (Cl. 165—9)

My invention relates to an improved seal for rotary regenerators, particularly what may be termed the main or bulkhead seal which prevents or minimizes flow of fluid from one passage to another in a regenerator. In its preferred embodiment, the invention is particularly applicable to a regenerator of the general type described in U.S. Patents Nos. 2,888,248; 3,057,604; and 3,077,074. The seal is moreover especially suited to cooperate with a regenerator matrix which has a generally smooth surface so that the seal can make a sliding contact with the matrix and preferably one in which the passages for flow of fluid through the matrix are elongated in the direction of movement of the matrix with respect to their dimension across the face of the matrix. A matrix having this characteristic is disclosed in my patent application Ser. No. 508,711, filed Nov. 19, 1965, for Regenerator Matrix, of common ownership with this application, which may be referred to if necessary for an understanding of my present invention.

A rotary regenerator is a device in which a movable matrix, ordinarily mounted for rotation about an axis, moves between two passages in one of which a cold gas flows through the matrix and in the other of which a hot gas flows through the matrix. Heat surrendered to the matrix by the hot gas is transferred to the cold gas. Ordinarily, there is a pressure difference between the two gases, particularly when the regenerator is applied to a gas turbine. Leakage of the high pressure fluid to the low pressure is highly inimical to turbine efficiency, and regenerator matrices display a strong tendency to change shape with changes in temperature. This thermal distortion of the matrix, and a main seal structure to cope with this problem, are described more fully in the aforementioned Patent No. 2,888,248.

My invention is directed to providing a seal which may be essentially a contact type seal as distinguished from a labyrinth seal and in which a small but sufficient and reasonably constant pressure biases the seal against the matrix. This involves provisions for minimizing the fluctuations in the force exerted on the seal by the gas contained in the matrix passing under the seal. My invention also involves a compliant structure of the seal resulting from a segmented construction in which the segments may shift relatively to each other and to their support to accommodate distortions and irregularities of surfaces of the matrix. My invention also involves novel and ingenious structural arrangements to provide the results referred to above.

The principal objects of my invention are to improve the efficiency and durability of rotary regenerators, to provide a more effective and more durable main seal for a regenerator, to provide a seal particularly suited to obtain greatest efficiency with a matrix having flow passages relatively long in the direction of movement and narrow across this direction, to provide a seal which conforms accurately and readily to the surface of the matrix, to provide a seal which bears with substantially constant light pressure against the matrix and, in general, to provide a seal embodying any or all of the objects stated above.

The nature of the invention and the advantages thereof will be clear to those skilled in the art from the succeeding detailed description of the preferred embodiment of the invention and the accompanying drawings thereof.

FIGURE 3 is a sectional view of the same taken on the plane indicated by the line 3—3 in FIGURE 2.

FIGURE 4 is a sectional view taken on the plane indicated generally by the line 4—4 in FIGURE 3.

FIGURE 5 is a sectional view taken on the plane indicated by the line 5—5 in FIGURE 4.

FIGURE 6 is a sectional view taken on the plane indicated by the line 6—6 in FIGURE 4.

FIGURE 7 is a fragmentary view taken on the plane indicated by the line 7—7 in FIGURE 4.

FIGURE 8 is a sectional view taken on the plane indicated by the line 8—8 in FIGURE 3.

FIGURE 9 is a fragmentary axonometric view of the upper main seal.

FIGURE 10 is a fragmentary axonometric view of the lower main seal.

FIGURE 16 is an elevation of the leading face of an upper outer seal block.

FIGURE 17 is a side view of the same.

FIGURE 18 is a view of the inner or sealing face of the same.

FIGURE 19 is a side view of a lower outer seal block.

FIGURE 20 is a view of the sealing face of the same.

FIGURE 21 is a view of the leading face of an upper inner seal block.

FIGURE 22 is a side view of the same.

Figure 1:
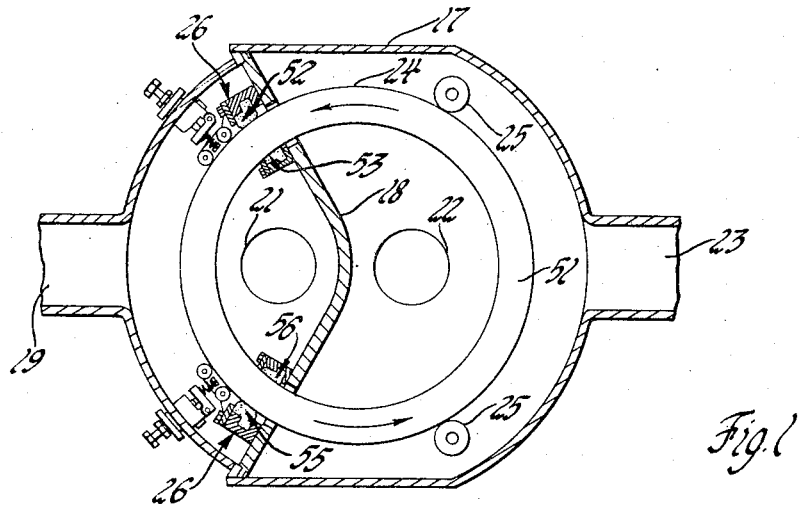
FIGURE 1 is a somewhat schematic representation of a rotary regenerator with a drum type matrix having main seals embodying my invention.

Referring first to FIGURE 1, a conventional drum type rotary regenerator may include a suitable housing 17 divided by a bulkhead 18 into a high pressure cool gas zone at the left of the bulkhead and a low pressure hot gas zone at the right of the bulkhead. The gas to be heated, which may be compressor discharge air, enters the housing at an inlet 19, flows through the forward portion of the matrix 24 as illustrated, and is discharged through an outlet 21. The hot gas, which may be turbine exhaust gas, enters the housing to the rear of the bulkhead through an inlet 22, flows outward through the matrix, and is discharged through an exhaust duct or outlet 23. The matrix 24 may be supported and rotated in the direction indicated by the arrows by supporting rollers 25, some of which may have gear teeth cooperating with ring gears on the matrix. Two main seals 26 are provided where the matrix 24 passes through the bulkhead 18 to minimize leakage of gas from the higher pressure to the lower. So far as the structure has been described, it corresponds to that disclosed in the above-mentioned U.S. patents and the matrix preferably is of the type described in the aforementioned application Ser. No. 508,711. It is, therefore, unnecessary to enlarge upon the details of these structures.

Figure 2:
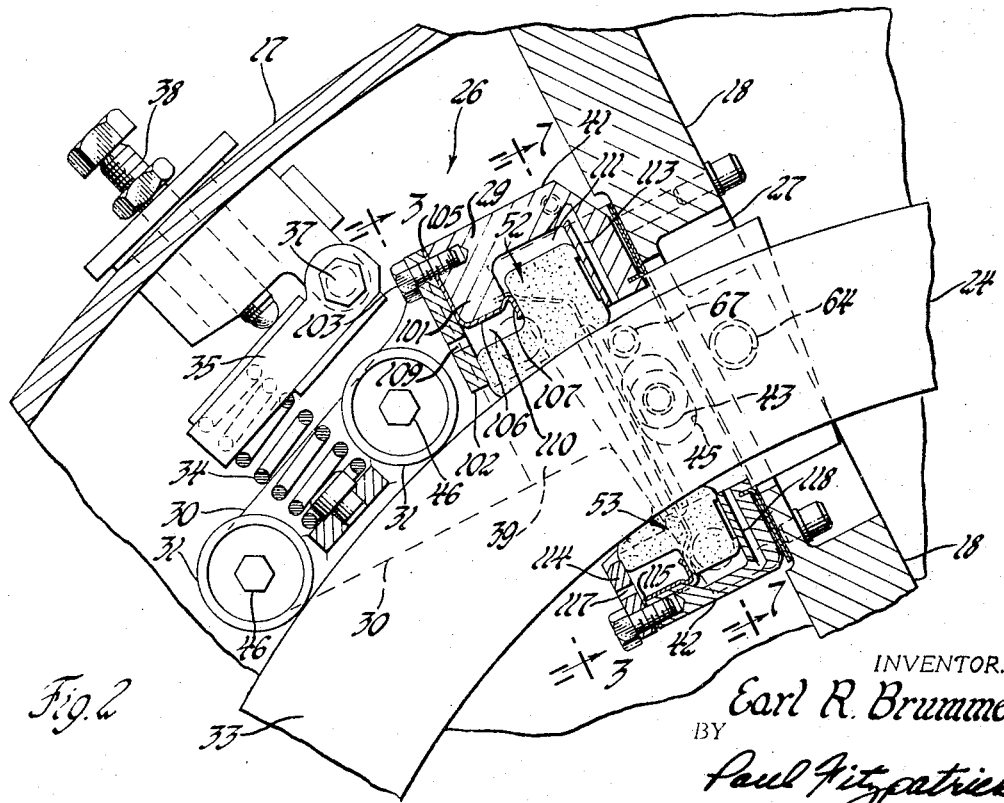
FIGURE 2 is a view partly in section, on a plane normal to the axis of rotation of the matrix, illustrating the main seal installation.

The bulkhead 18 defines two openings 27 providing clearance for the matrix, which may expand relative to the casing because of temperature changes. The main seals 26 of the invention are mounted at the left or high pressure side of the bulkhead around the openings 27. Each seal embodies a rigid rectangular supporting frame 29 encircling the matrix, which is kept aligned with the matrix by a roller support or bogey including an arm 30 extending from each end of the seal frame and mounting rollers 31 which roll on tracks defined by the end rings or rims 33 of the matrix. The rollers 31 are biased into engagement with the matrix by compression springs 34 reacting against abutments 35 on the housing. The abutments may be pivoted at 37 and adjusted to vary the force of springs 34 by set screws 38. This structure for guiding the seal on the matrix is similar to that of Patent No. 3,077,074 and need not be further described. Arms 30 are integral with end plates 39 (FIGURES 2 to 4) which define each end of the rectangular seal frame or seal support 29. The other two major elements of the seal support are an outer support or retainer 41 and an inner support or retainer 42, these extending between and being fixed to the end plates 39. The seal is located circumferentially of the matrix, as in previous regenerators, by roller trunnions 43 mounted on shafts extending from the end plates and guided in radially extended recesses 45 in the bulkhead or regenerator case.

Referring now primarily to FIGURES 4 and 8 to illustrate more fully the structure at the ends of the main seal, an end plate 39 is shown in FIGURE 4, which also illustrates the bolts 46 which mount the rollers 31 and cap screws 47 which secure the end plates to the supports 41 and 42. The primary seal, that is the part of the seal which bears directly against the matrix, includes a rim seal plate 49 riding against the plane annular end faces of the matrix defined by the end rings or rims 51 of the matrix. It also includes radially inner and outer seals, each of which comprises a row of separate seal blocks, preferably of ceramic material such as alumina, mounted in the support 41 or 42. These blocks, seen most clearly in FIGURES 9, 10 and 16 to 22, include blocks 52 on the outer side of the upper seal, 53 at the inner side of the upper seal, 55 at the outer side of the lower seal, and 56 at the inner side of the lower seal. While the seal blocks of these sets are similar in principle, they are all of different structure because of the adaptation of the blocks to the curvature of the matrix and because of the different direction of movement of the matrix with respect to the bulkhead at the two points. We may pass over for the time being the details of the seal blocks.

The rim seal 49, as shown most completely in FIGURE 8, is a sector of an annulus having the same inside and outside diameters as the matrix. It bears a rib 57 on its outer surface extending generally parallel to the bulkhead which is machined to provide a slot 58 for a secondary seal strip 59. The secondary seal strip 59 provides a seal between the end plate 39 and the primary seal members to accommodate the shifting of the elements that engage the matrix. The rib 57 on the rim seal is received in a recess or slot 61 in the inner surface of the end plate 39 which thus locates the rim seal against movement circumferentially of the matrix and allows it to move radially of the matrix with expansion or distortion of the matrix. As shown most clearly in FIGURE 6, the rim seal 49 is provided with a friction reducing high temperature resisting facing 62 of any suitable composition. FIGURE 6 also illustrates sheet metal bypass seals 63 and 65 which are spot welded to the end plate 39 and extend circumferentially of the matrix to block radial flow, bypassing the matrix. The outer bypass seals 63 engage the case or housing 17 and the inner bypass seal 65 engages the rim seal 49. A coil compression spring 64 disposed in a recess 66 in each end plate 39 bears against the rim seal 49 to hold it against the matrix rim. A smaller coil spring 67 in a recess adjacent the slot 61 also engages and biases the rim seal.

The rows of seal blocks such as 52 and 53 are held in contact with each other by force exerted by end blocks 70 at the outer side of the matrix and 71 at the inside of the matrix. These end blocks also cooperate with secondary seal strip 59 to close the gap which would otherwise exist between the ends of each row of seal blocks such as 52 and the end plates 39. The end blocks 70 and 71 have one surface curved to fit the radially outer or inner surface of the rim seal 49 and are otherwise contoured to fit into the block mounting slots 73 and 74 in the supports 41 and 42, respectively. The outer end surface of these blocks are provided with a narrow slot within which one edge of the secondary seal strip 59 fits, as indicated in FIGURES 5 and 8. The end blocks 70 and 71 bear against the radially directed surfaces of the rim seal 49 and against a radial surface of the support 41 and 42, thus providing a flow block extending from the outer support 41 to the inner support 42 and, with the secondary seal 59, a flow block extending from the outermost seal blocks 52 or 53 to the end plates 39.

The outer end blocks 70 are pressed together against the seal blocks 52 by compression springs 76 received in recesses in the end plates 39, thus holding the blocks 52 together. The inner end blocks 71 are in a region of higher temperature than the outer blocks in the preferred application of the regenerator. The compressive force on the stack of inner seal blocks 53 is therefore provided by air pressure rather than by a spring. As illustrated most clearly in FIGURES 4 and 7, a reciprocable ceramic plug or piston 77 is disposed in recess 78 in the end plate 39. The chamber behind the piston 77 in the recess 78 is exposed to pressure of air ahead of the matrix through a plugged passage 79 and a radial passage 81 (see FIGURES 7 and 4) which extends through the end plate 39 to the outer side of the matrix. A button similar to piston 77 (not illustrated) may be fixed in the other end plate 39 to provide an abutment against which the piston 77 presses the blocks 53. Thus a slight air pressure difference due to drop through the matrix is exerted on the seal blocks.

A tertiary seal arrangement is provided to prevent bypassing of air through the clearance between the seal frame 29 and the opening 27 in the bulkhead 18. This seal must permit the main seal structure to move to some extent relative to the bulkhead. As shown principally in FIGURES 4 and 8, L-section sheet metal strips 82 and 83 engage in slots, extending parallel to the inner and outer surfaces of the matrix, cut in the end plates 39 and the low pressure face of the supports 41 and 42. A rectangular ring 85 of two thin layers of shim stock lies between the seal strips 82 and 83 and the face of the bulkhead. This rectangular shim stock frame extends across the inner and outer face of the matrix and radially of the matrix across the end rims outside of end plate 39, being received in a sawcut 86 in the outer surface of each end plate. This tertiary seal may comprise two rectangular shim stock frames laid one behind the other, with the breaks in the rings to permit them to be fitted over the seal disposed at opposite ends of the frame. The structure of ring 85 is similar to the secondary seal 106 of U.S. Patent No. 3,057,604 and serves the same purpose.

We may now proceed to consideration of the preferred structure of the portion of the primary seal which engages the inner and outer surfaces of the matrix, comprising for the upper seal the support 41, seal blocks 52, the support 42, and seal blocks 53. The seals at the inner and outer diameter of the matrix are essentially the same, but there are dimensional differences because of the different curvature of the surfaces of the matrix with which they coact and because of the radial convergence of the cells in the matrix which they seal. There is also a structural difference between the upper seal 26 where the matrix moves from low to high pressure and the lower seal 26 where the matrix travels from high to low pressure. This difference lies primarily in the fact that the matrix engaging or sealing faces of the seal block have an effective taper at the trailing edge of the block with respect to matrix movement. Thus, the sealing faces of the upper seal blocks 52 and 53 converge at the high pressure side and those of the lower seal blocks 55 and 56 converge at the low pressure side. So, while all four of the types of seal blocks are similar in principle, they differ in structure.

Figure 11:
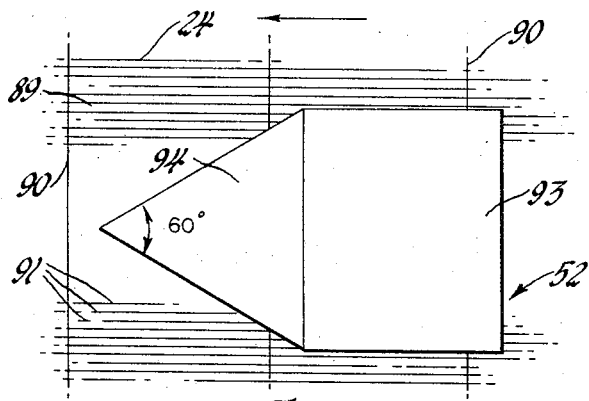
FIGURES 11 to 13 are diagrammatic representations of a seal block matrix to explain the principles of the invention.

The principle underlying the configuration in the seal blocks may be explained with reference to FIGURES 11, 12 and 13. FIGURE 11 represents the sealing face of an individual seal block, such as one of the seal blocks 52, overlying the matrix 24 which may be considered to have fluid conducting cells 89 defined by walls or partitions 90 extending transverse to the direction of movement of the matrix and 91 extending in the direction of movement of the matrix. The walls 91 may, as a practical matter, be reversely corrugated sheets extending circumferentially and radially of the matrix and the walls 90 may be any means to prevent flow circumferentially of the matrix, such as the major corrugations of the matrix stock disclosed in my prior application Ser. No. 508,711. The matrix engaging face of the seal block 52 may be considered to consist of a rectangle 93 and a triangle 94. The length of both the rectangle and triangle in the direction of the movement of the matrix is substantially the distance between the transverse walls or partitions 90 of the matrix. The width across the matrix of the block 93 may be varied to some extent, but preferably the triangle 94 is substantially equilateral so that the angle at the vertex is near 60°.

Figure 12:
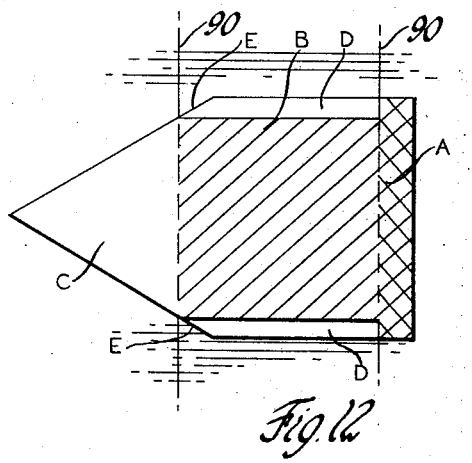
Figure 13:
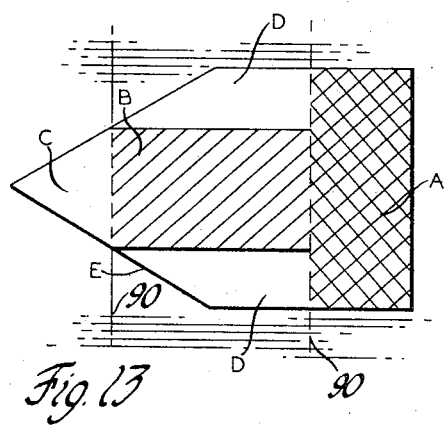

The reason for this may be appreciated from FIGURES 12 and 13 in which the pressure areas under the seal block as the matrix moves from left to right in the figures are indicated. In both figures the cross shaded area represents the portion of the matrix under the seal which is in communication with the pressure to which the matrix is exposed as it moves into the seal. The shaded area A is exposed directly to the pressure in the matrix on the incoming side, which is low pressure in the case of blocks 52 and 53 and high pressure in the case of blocks 55 and 56. The singly shaded area B is subjected to the entering pressure trapped within the matrix between the inner and outer seals. The tip area C and side areas D are in communication with the pressure in the matrix on the side toward which the matrix moves, which is high pressure at the upper seals and low pressure at the lower seals. Areas D are exposed to downstream pressure at the edges E of the face. As the matrix partitions 90 move past the seal, the area A increases in size, the area B decreases, the area C decreases, and the areas D increase. If the included angle at the vertex is 60°, the sum of areas A and B will be constant and likewise the sum of areas C and D. Thus, the area of the seal blocks exposed to high pressure and the area exposed to low pressure are constant as the matrix moves under the seal. It is quite important that the pressure force exerted on the seal block tending to lift it from the matrix be reasonably constant because it facilitates biasing of the seal against the matrix by a constant pressure and maintenance of a light sliding contact in the seal. The angle of the vertex does not have to be exactly 60°, since the same effect of substantially constant areas exposed to each of the two pressures may be had with appreciable variation from the 60° angle. However, this angle is considered to be optimum.

It may be pointed out, to eliminate possible confusion, that the overall outline of the seal blocks is rectangular, as will be clearly apparent from FIGURES 9 and 10. However, since the pressure at the matrix side of the seal block within the relieved or cutaway portion balances the pressure over the same area at the side of the block remote from the matrix, the effect is the same as if the overall outline of the block were as illustrated schematically in FIGURES 11 to 13. As a matter of fact, in the physical embodiment the seal blocks such as 52 could have the overall outline shown in FIGURES 11 and 13, but it is desirable to have abutting faces between adjacent seal blocks over substantially the entire outline of the side of the block.

Figure 14:
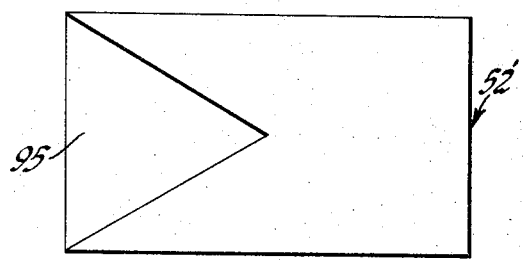
FIGURES 14 and 15 illustrate variations in the form of the seal block.
Figure 15:
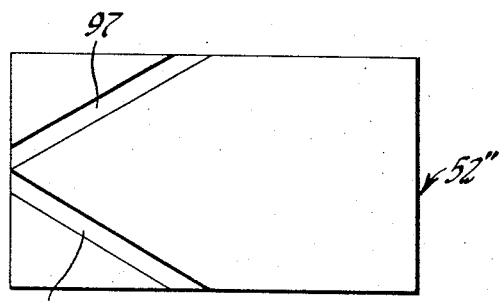

FIGURES 14 and 15 illustrate the point that the sealing face does not have to be convergent in the manner illustrated by FIGURES 11 and 13. For example, in FIGURE 14 a hypothetical seal block 52' is illustrated in which a triangular relief or cut-away 95 is provided in the sealing face. FIGURE 15 illustrates a block 52" in which the pressure on the trailing side of the seal is admitted to the matrix under the seal by grooves 97 in the sealing face. Other configurations having the equivalent effect could readily be devised.

Now proceeding to the structure and mounting of the seal block and taking the blocks 52 as illustrative, we may consider primarily FIGURES 2, 3, 8, and 9. As viewed in the direction of the axis of the matrix, the blocks 52 are L-shaped, with the upper arm of the L fitted into the slot 73 of the support 41. The lower arm of the L which rides against the surface of the matrix underlies a flange 101 of the support. The support for the seal block is completed and the blocks are retained by a rectangular cover plate 102 fixed to the face of the support by cap screws 103. A folded sheet metal seal strip 105 is held between the support 41 and the cover plate 102. This seal strip comprises a portion 106 underlying the support and a flange 107 bearing against the radial face of the upper leg of the seal block. A series of holes 109 in the cover plate admit the high pressure into a space 110 extending across the seal above the lower legs of the seal blocks. Low pressure is admitted to a chamber 111 extending over the upper ends of the upper legs of the seal blocks through passages 113 in the support which communicate with the lower edge of the support 41, and through the opening 27 in the bulkhead, with the low pressure. It will thus be seen that the outer surface of the seal block defines a low pressure piston exposed to pressure in the chamber 111 and a high pressure piston exposed to pressure in the chamber 110. These pressures bias the seal toward the matrix in opposition to the pressure in the matrix tending to lift the seal block from the matrix. The lip or flange 107 of the seal strip 105 seals between these two pressure chambers 110 and 111 and bears against the upper leg of the seal blocks 52.

The inner upper seal blocks 53 are retained in support 42 by a cover plate 114, are sealed by a seal strip 115, and are biased by pressure admitted through openings 117 and passages 118 so that the pressure bias arrangement is the same as for the outer seal blocks. The same considerations apply to the lower seal in which the inner seal blocks are retained by a cover plate 114 and the outer by a cover plate 102. The high pressure is conveyed to a chamber 121 or 122 (FIGURE 10) and the low pressure to a chamber in the outer support (not illustrated) and a chamber 124 in the inner seal support. The radially inner seal assemblies have seal strips 125 similar in structure but slightly different dimensionally from the outer seal strips 105 which serve the same function as the outer seal strips.

Understanding of the structure of the segmented seals may be furthered by consideration of FIGURES 16 to 22, which are views of actual seal blocks of the preferred embodiment. As stated previously, the seal blocks are generally L-shaped or shoe-shaped with basically parallel sides which abut the adjoining seal blocks and with a sealing face of which approximately half the length is a rectangle 93 and the other half is a triangular area 94. The outer arm 130 fits into the recess, such as 73, in the seal support. The sealing surface is cut away as indicated at 131 for block 52, at 132 for block 55, and at 133 for block 53, to provide the tapering portion 94 of the sealing face. Portions of one side of the block and of the outer or leading face of the upstanding leg 130 are relieved by suitable process such as sandblasting or chemical machining to provide shallow recesses and passages in the surfaces. Specifically, the outer face of the upstanding leg has two such recesses 135 and 136 extending in from the sides of the block, leaving the original surface across the outer and inner ends of the surface and in a ridge 137 which may abut the support. One side face of the block has a relief 139 extending downwardly from the radially outer surface to a rib 141 defined by the original surface and a second relief portion 142 which terminates short of the matrix engaging face. The relief 142 includes a notch 143 extending through to the relief 136 so that the pressure at the high pressure side of the seal is communicated to the rear face to balance in large measure the axial force on the seal block due to the high pressure exerted against the opposite face. This minimizes friction of the rear face of the block against the radial surface of the support. The recess 135 is, of course, pressurized through the notch 143 of the adjacent block. The recesses in the side faces of the block also minimize the contact area between adjacent blocks. Inspection of FIGURES 19 and 20 will reveal that the lower outer seal block 55 is substantially the same as seal block 52 except that the relief 132 is at the low pressure end of the seal face rather than the high pressure end. For this reason the side relief 144 is of slightly different shape from the relief 142.

The seal block 53 as illustrated in FIGURES 21 and 22 has relieved areas 135 and 136 in the low pressure face and relieved areas 139 and 142 in the side face, the latter communicating high side pressure to the recess 136. The seal block 56 is again substantially the same as block 53 except for the opposite disposition of the seal face relief.

The seal blocks of each set, those in each support such as 41 or 42, are held in abutting relation by slight pressure exerted on end blocks such as 70 and 71 by the springs and air-loaded pistons. They are biased against the radial wall of the support by the difference between the high and low pressures in the regenerator.

The seal blocks are biased away from the matrix by the pressures in the matrix and toward the matrix by the high and low gas pressures exerted on the high and low pressure piston areas of the inner face of the seal blocks. By providing a slight excess of force on the piston areas, the blocks can be held in light sealing contact with the matrix. With the alumina blocks of the described embodiment, a net force biasing the blocks against the matrix of about two pounds per square inch is desired. This is accomplished by subjecting a slightly greater piston area to the high pressure than to the low, the excess area depending upon the seal block sealing surface area and the pressures obtaining in the regenerator in operation. No biasing springs are required, and the biasing action is simple and reliable.

If the seal blocks are out of contact with the matrix upon start-up, they are self-sealing. The reason for this is that if a seal block has lifted from the matrix a leakage flows from high to low pressure occurs over the outer face of the block. This acceleration of the air occurs at the expense of static pressure, and thus the static pressure over the seal block will diminish, while that under the seal block in the support remains constant. The resulting force will press the seal block against the matrix to provide the contact type seal relation.

The exact relation of the areas of the high and low pressure pistons may be calculated approximately and refired by experimental evaluation. It may not be the same at both openings in the bulkhead because of the reverse direction of change of pressure at the two.

It will be clear from the foregoing that a simple, durable, close-fitting contact seal is provided by my invention. In a typical installation, the seal blocks may be less than one inch wide, and thus the seal may closely follow the surface of the matrix notwithstanding thermal distortion.

The detailed description of the preferred embodiment of my invention is not to be considered as limiting the scope of the invention. Many modifications may be made by the exercise of skill in the art.

I claim:
1. A seal element adapted to engage a moving rotary regenerator matrix having an outer face to engage the matrix,
   leading and trailing faces with respect to the direction of matrix movement,
   an inner face opposite to the outer face,
   and side faces,
   the outer face having a rectangular sealing area adjacent the leading face and a triangular sealing area extending from the rectangular sealing area adjacent the trailing face.
2. A seal comprising a plural number of sealing elements as defined in claim 1,
   the elements being disposed in a row with their side faces abutting.
3. A seal element as defined in claim 1 in which
   the outer face defines two piston areas
   and defines a surface adapted to engage a wall separating the piston areas.
4. A seal element as defined in claim 1 composed of a refractory ceramic material.
5. A seal element as recited in claim 1 in which
   one of the leading and trailing faces of the element is relieved to provide a pressure area to balance pressure exerted on the other of the said faces.
6. A seal element as recited in claim 5 in which one side faces of the element is relieved to define a fluid path between the leading and trailing faces.
7. A rotary regenerator comprising, in combination,
   stationary structure including a bulkhead having an opening,
   a pervious heat exchange matrix,
   means mounting the matrix for movement such that the matrix passes through the opening,
   the matrix being pervious to fluid flow in a direction generally parallel to the bulkhead,
   the matrix having a sealing surface through which fluid flows, and including a grid-like structure dividing the surface into cells and blocking fluid flow between the cells, the cells being much wider in the direction of movement of the matrix than in the transverse direction,
   a seal on the bulkhead extending transversely to the direction of movement of the matrix in contact with the said sealing surface,
   the width of the seal in the direction of matrix movement being at least approximately twice the width of the cells in such direction,
   the face of the seal in contact with the matrix being relieved toward the trailing portion thereof so that the contact area decreases gradually from continuous contact to no contact over approximately the trailing half of the width of the seal.
8. A regenerator as recited in claim 7 in which the seal comprises relatively movable segments,
   each segment being relieved toward the trailing portion of the face.
9. A regenerator as recited in claim 8 including means to expose the seal segments to gas pressures on the opposite side of the bulkhead over predetermined portions of the segments so as to bias the segments against the matrix.
10. A regenerator as recited in claim 7 in which
    the stationary structure includes a housing divided by the bulkhead into two zones, one traversed by a relatively high pressure gas, and the other by a relatively low pressure gas.
11. A regenerator as recited in claim 10 including
    means to expose the seal over predetermined areas to the pressures of the two said gases so as to bias the seal against the matrix.
12. A regenerator as recited in claim 11 in which the seal is segmented.
13. A regenerator comprising, in combination,
    stationary structure including a bulkhead, a heat exchange matrix pervious to fluid flow through the matrix in a first direction, means movably mounting the matrix so that it travels past the bulkhead in a second direction transverse to the first direction, the matrix extending in a third direction transverse to the first and second directions, the matrix being defined by fluid-conducting cells extending through the matrix in the first direction and having walls blocking fluid flow in the other two directions, the matrix having a sealing surface defined by the ends of the cells, a stationary seal on the bulkhead extending across the matrix in the third direction and cooperating with the said sealing surface, the seal having a contact face cooperating with the sealing surface of the matrix, the effective width of the contact face in the second direction being at least approximately twice the dimension of the matrix cells at the sealing surface in the same direction, the seal having recesses in the trailing half of the contact face diverging in the direction of movement of the matrix for approximately the dimension of the matrix cells at the sealing surface in the second direction so as to progressively expose the cells of the matrix during movement thereof.

14. A regenerator as recited in claim 13 in which the seal comprises juxtaposed segments independently movable to conform to the matrix surface notwithstanding distortion of the matrix.

15. A regenerator as recited in claim 14 in which each segment has at least one recess.

16. A regenerator as recited in claim 15 in which the recess in the segment diverges toward the trailing end of the segment.

17. A regenerator as recited in claim 16 in which the recess extends outward from the middle of the segment.

18. A regenerator as recited in claim 16 in which the recess extends inward from the margins of the segment.

19. A regenerator as recited in claim 13 in which the recesses diverge in the direction of matrix movement at an angle of approximately sixty degrees.

20. A bulkhead seal for a rotary regenerator having a heat transfer matrix comprising, in combination, a support adapted to extend across the regenerator matrix, the support having a slot extending across and facing the matrix, a plural number of contact seal elements disposed side-by-side in abutting relation in the slot, each seal element having an outer face to engage the regenerator matrix, leading and trailing faces with respect to the direction of matrix movement, and an inner face confronting the support, the leading and trailing faces being partially within the slot so that the support locates the elements in the direction of matrix movement, secondary seal means engaging the support and the inner face of the elements dividing the inner faces into a piston at the leading edge portion of the element and a piston at the trailing edge portion of the element, and means in the support for communicating pressures within the regenerator at each side of the seal to the pistons adjacent the respective sides.

21. A seal as recited in claim 20 including means to press the seal elements together with a controlled force.

22. A seal as recited in claim 21 in which the means to press is a piston, and means to communicate pressure in the regenerator to the piston.

23. A seal as recited in claim 20 including means in contact with the matrix connected to the support to locate the support relative to the matrix.

24. A seal as recited in claim 20 in which each seal element has an outer face the sealing portion of which tapers toward the trailing face of the element.

25. A seal as recited in claim 24 in which the angle of taper is approximately sixty degrees.

26. A seal as recited in claim 20 in which the relative areas of the pistons are such that the force due to static pressures on the inner face are slightly greater than the forces on the outer face due to pressure within the matrix.

References Cited

UNITED STATES PATENTS 2,888,248    5/1959    Bubniak et al.    165—9
3,175,605    3/1965    Kolthoff    165—9

ROBERT A. O'LEARY, *Primary Examiner.*

A. W. DAVIS, JR., *Assistant Examiner.*